(12) United States Patent
DiAcetis et al.

(10) Patent No.: US 9,641,977 B2
(45) Date of Patent: May 2, 2017

(54) INFERRING POSITIONS WITH CONTENT ITEM MATCHING

(71) Applicant: Microsoft Technology Licensing, LLC, Redmond, WA (US)

(72) Inventors: Stephen P. DiAcetis, Duvall, WA (US); Jyh-Han Lin, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/809,157

(22) Filed: Jul. 24, 2015

(65) Prior Publication Data
US 2016/0029170 A1 Jan. 28, 2016

Related U.S. Application Data

(63) Continuation of application No. 13/309,563, filed on Dec. 2, 2011, now Pat. No. 9,125,022.

(51) Int. Cl.
*H04W 4/02* (2009.01)
*H04W 4/00* (2009.01)
(Continued)

(52) U.S. Cl.
CPC ............. *H04W 4/023* (2013.01); *H04L 67/10* (2013.01); *H04W 4/003* (2013.01); *H04W 4/043* (2013.01)

(58) Field of Classification Search
CPC .................................................... H04W 4/02
See application file for complete search history.

(56) References Cited

U.S. PATENT DOCUMENTS 8,204,437 B1 * 6/2012 Rothschild ............. H04W 4/02
455/41.1
8,589,069 B1 * 11/2013 Lehman ................. G01C 21/20
340/995.1
(Continued)

OTHER PUBLICATIONS

Pang, et al., "LED Location Beacon System Based on Processing of Digital Images", IEEE Transactions on Intelligent Transportation Systems, vol. 2, No. 3, Sep. 2001, pp. 135-150 Retrieved at: http://ieeexplore. ieee.org/stamp/stamp.jsp?tp= &arnumber=954547.

(Continued)

*Primary Examiner* — Christopher M Brandt

(57) ABSTRACT

Embodiments infer position information using captured content items. A computing device such as a mobile computing or a cloud service analyzes one or more content items to generate information describing the content items. For content items that include photographs, for example, the photographs are processed to identify faces, objects, places, text, etc. The generated information is compared to reference content items (e.g., image comparison), user data (e.g., calendar data, contact information, etc.), and/or public data (e.g., address information, event information, etc.) to identify at least one match. Location information associated with the matched reference content items, user data, and/or public data is obtained. A position is determined for the content items based on the location information obtained from the matched reference content item, user data, and/or public data. In some embodiments, the obtained location information is used to refine a position determined using a beacon-based positioning service.

21 Claims, 7 Drawing Sheets

(51) Int. Cl.
*H04W 4/04* (2009.01)
*H04L 29/08* (2006.01)

(56) References Cited

U.S. PATENT DOCUMENTS

| | | | |
|---|---|---|---|
| 2006/0089792 A1* | 4/2006 | Manber | G01C 21/3644 701/408 |
| 2006/0287813 A1 | 12/2006 | Quigley | |
| 2007/0276590 A1 | 11/2007 | Leonard et al. | |
| 2008/0226130 A1* | 9/2008 | Kansal | G01C 21/20 382/106 |
| 2009/0049004 A1 | 2/2009 | Nurminen et al. | |
| 2009/0058685 A1 | 3/2009 | McCall et al. | |
| 2010/0125409 A1 | 5/2010 | Prehofer | |
| 2010/0191459 A1 | 7/2010 | Carter et al. | |
| 2010/0250136 A1* | 9/2010 | Chen | G06F 17/30247 701/300 |
| 2010/0309225 A1 | 12/2010 | Gray et al. | |
| 2011/0098056 A1* | 4/2011 | Rhoads | G01C 21/20 455/456.1 |
| 2011/0105152 A1* | 5/2011 | Yu | H04W 4/02 455/456.3 |
| 2011/0131028 A1 | 6/2011 | Hodgkin et al. | |
| 2011/0134240 A1 | 6/2011 | Anderson et al. | |
| 2011/0165888 A1* | 7/2011 | Shuman | G06F 17/30041 455/456.1 |
| 2011/0201360 A1 | 8/2011 | Garrett et al. | |
| 2011/0254978 A1* | 10/2011 | Yamaji | G01S 19/48 348/231.3 |
| 2011/0294517 A1 | 12/2011 | Hahm et al. | |
| 2012/0072566 A1* | 3/2012 | Cho | G06Q 50/01 709/223 |
| 2012/0086825 A1* | 4/2012 | Yost | H04N 5/23222 348/216.1 |
| 2012/0105474 A1* | 5/2012 | Cudalbu | H04W 4/02 345/633 |
| 2012/0131028 A1* | 5/2012 | Glachant | G06F 17/30241 707/758 |
| 2012/0133506 A1* | 5/2012 | Chou | H04W 4/02 340/539.13 |
| 2012/0154606 A1* | 6/2012 | Ye | H04L 67/2804 348/207.1 |
| 2012/0191709 A1* | 7/2012 | Morrison | G06F 17/30265 707/737 |
| 2012/0210200 A1 | 8/2012 | Berger et al. | |
| 2012/0249554 A1* | 10/2012 | Chen | G06K 9/00979 345/428 |
| 2012/0252483 A1 | 10/2012 | Farmer et al. | |
| 2013/0007063 A1 | 1/2013 | Kalra et al. | |
| 2013/0044196 A1* | 2/2013 | Guan | G06K 9/00221 348/77 |
| 2013/0110565 A1* | 5/2013 | Means, Jr. | G06Q 10/063 705/7.11 |
| 2013/0130711 A1 | 5/2013 | Bergsbjork et al. | |
| 2013/0137468 A1* | 5/2013 | Kahle | G01C 15/00 455/457 |

OTHER PUBLICATIONS

Davis, et al., "From Context to Content: Leveraging Context to Infer Media Metadata", Multimedia 2004, Association for Computing Machinery, Oct. 2004, 8 pages.
Unknown, "Location-Aware Photo Project at Microsoft Research Pinpoints Transcontinental Trek", Microsoft Corporation, Feb. 2004, 3 pages Retrieved at: http://www.microsoft.com/presspass/features/2004/feb04/02-02mediaexchange.mspx.
Toyama, et al., "Geographic Location Tags on Digital Images", Multimedia 2003, Association for Computing Machinery, Nov. 2003, 11 pages.
U.S. Appl. No. 13/309,563, Non Final Office Action Mailed Jul. 16, 2012, 9 pages.
U.S. Appl. No. 13/309,563, Final Office Action Mailed Feb. 15, 2013, 15 pages.
U.S. Appl. No. 13/309,563, Non Final Office Action Mailed Jul. 2, 2014, 10 pages.
U.S. Appl. No. 13/309,563, Final Office Action Mailed Nov. 4, 2014, 10 pages.
U.S. Appl. No. 13/309,563, Notice of Allowance Mailed Apr. 22, 2015, 5 pages.

* cited by examiner

INFERRING POSITIONS WITH CONTENT ITEM MATCHING

CROSS-REFERENCE TO RELATED APPLICATIONS

This application is a Divisional Application of U.S. patent application Ser. No. 13/309,563 filed on Dec. 2, 2011, the entirety of which is hereby incorporated by reference herein.

BACKGROUND

Many users carry computing devices such as laptops, mobile telephones, tablets, and media players throughout any given day. Some of these computing devices are equipped with global positioning system (GPS) receivers to provide positioning services to the users. These computing devices determine a current position for use in filtering search results (e.g., nearby restaurants), driving directions, and the like. When GPS service is unavailable or not effective (e.g., when the computing devices are indoor or when the computing devices lack a GPS receiver), some of the computing devices rely on other forms of position determination such as beacon-based positioning services. The accuracies of some existing beacon-based positioning services, however, may not meet the requirements of a given user scenario.

SUMMARY

Embodiments of the disclosure infer position information using captured content items. One or more content items are analyzed to generate information describing the content items. The generated information is compared to reference content items, user data, and/or public data to identify at least one match. The reference content items, user data, and/or public data have location information associated therewith. An inferred position is determined for the content items based on the location information associated with the matched reference content item, user data, and/or public data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
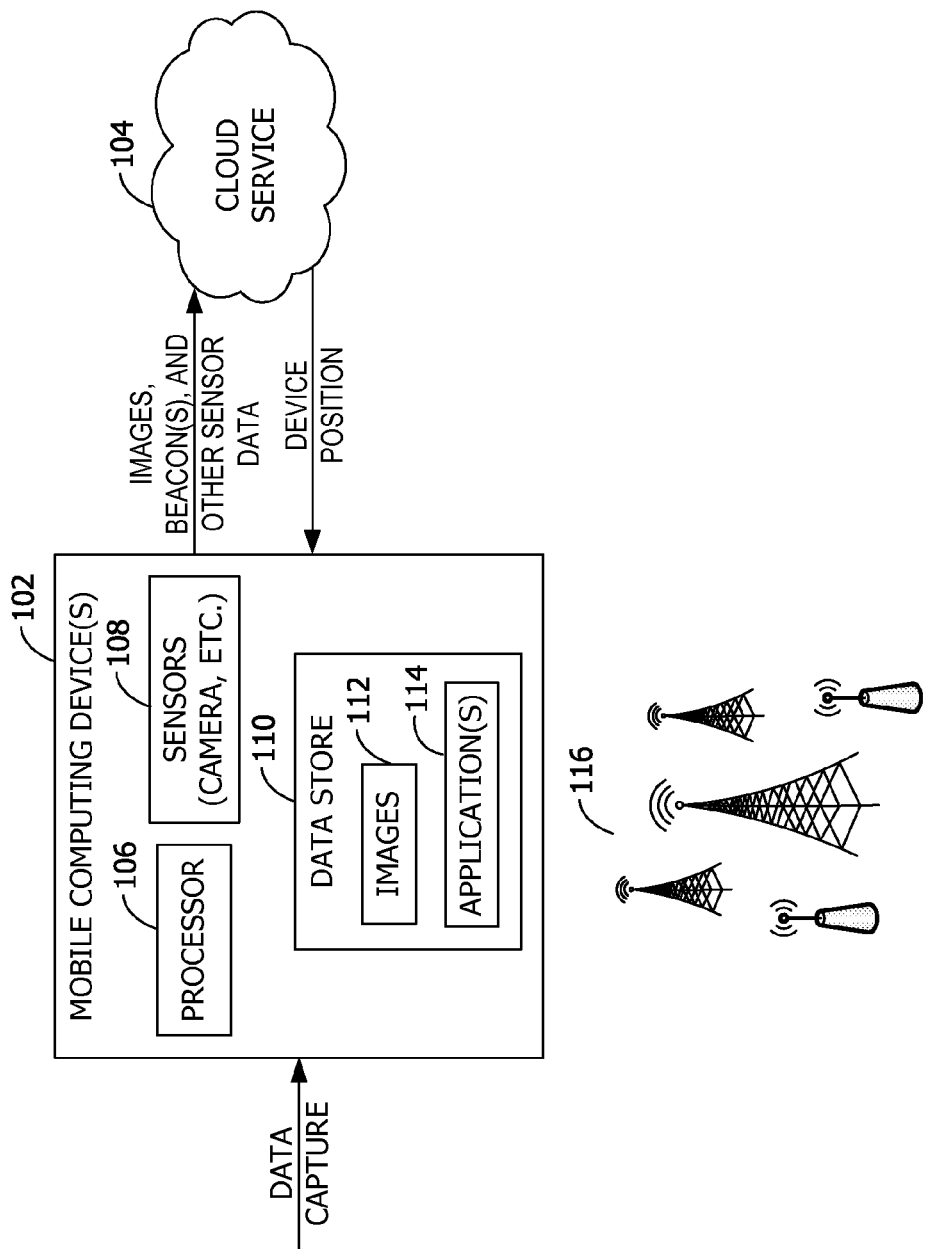
FIG. 1 is an exemplary block diagram illustrating a mobile computing device receiving a device position determined by a cloud service based on captured images and detected beacons.

Referring to the figures, embodiments of the disclosure use content items 502 captured by a computing device to determine a device position. In some embodiments, images 112 captured by a mobile computing device 102 aid in inferring the device position when other positioning services (e.g., beacon-based, satellite-based, etc.) are unavailable (e.g., when the mobile computing device 102 is indoors). Aspects of the disclosure further enable the captured content items 502 to refine an inferred position determined using other positioning services to improve the accuracy of the inferred position.

Some embodiments contemplate tagging beacon observations with captured content items 502 to associate the position of the captured content items 502 with beacons 116 observed at the position. Such embodiments provide location information 306 for beacons 116 that otherwise lack location information 306 (e.g., indoor beacons 116, moved beacons 116, moving beacons 116, etc.). Another example of positioning by image matching is during dead reckoning, where other positioning services are not usually available to correct drift. In such examples, the user may occasionally use a camera of the mobile computing device 102 for applications such as augmented reality.

Referring next to FIG. 1, an exemplary block diagram illustrates the mobile computing device 102 receiving a device position determined by a cloud service 104 based on captured images 112 and detected beacons 116. The mobile computing device 102 and the cloud service 104 represent a system for supplementing beacon-based positioning systems by using image matching. In the example of FIG. 1, the mobile computing device 102 is associated with a user and communicates with the cloud service 104 via any network, such as the Internet.

While described in some embodiments as a mobile telephone, the mobile computing device 102 represents any device executing instructions (e.g., as applications 114, operating system functionality, or both) to implement the operations and functionality described herein. The mobile computing device 102 may include any other portable device. In some embodiments, the mobile computing device 102 includes a mobile telephone, laptop, tablet, computing pad, netbook, gaming device, and/or portable media player. The mobile computing device 102 may also include less portable devices such as desktop personal computers, kiosks, and tabletop devices that are able to capture data. Additionally, the mobile computing device 102 may represent a group of processing units or other computing devices.

The mobile computing device 102 has at least one processor 106, one or more sensors 108, and a data store 110. The processor 106 includes any quantity of processing units, and is programmed to execute computer-executable instructions for implementing aspects of the disclosure. The instructions may be performed by the processor 106 or by multiple processors executing within the mobile computing device 102, or performed by a processor external to the mobile computing device 102. In some embodiments, the processor 106 is programmed to execute instructions such as those illustrated in the figures (e.g., FIG. 2, FIG. 4, and/or FIG. 6).

The mobile computing device 102 further has one or more sensors 108 associated therewith. The sensors 108 may be internal and/or external to the mobile computing device 102. Exemplary sensors 108 include, but are not limited to, a cellular radio or modem, a global positioning system (GPS) receiver, a Wi-Fi adapter or modem, a BLUETOOTH brand communication service element, a three-dimensional motion sensor, a camera, a microphone, one or more accelerometers, and a photoreceptive light sensor. Each of the sensors 108 provides at least one sensor value for use by the mobile computing device 102 (e.g., by an operating system or applications 114). The type and range of the sensor values vary based on the sensor 108 and may include, for example, numerical values and/or alphabetic values.

The mobile computing device 102 further has one or more computer readable media such as the data store 110. The data store 110 includes any quantity of media associated with or accessible by the mobile computing device 102. The data store 110 may be internal to the mobile computing device 102 (as shown in FIG. 1), external to the mobile computing device 102 (not shown), or both (not shown).

The data store 110 stores one or more content items 502 captured by the user of the mobile computing device 102 or otherwise received for storage by the mobile computing device 102. The content items 502 include, but are not limited to, still images (e.g., photographs), video, audio, and other data obtained via the sensors 108.

The data store 110 also stores, among other data, one or more applications 114. The applications 114, when executed by the processor 106, operate to perform functionality on the mobile computing device 102. Exemplary applications 114 include mail application programs, web browsers, calendar application programs, address book application programs, messaging programs, media applications, positioning services, search programs, and the like. The applications 114 may communicate with counterpart applications or services such as web services accessible via a network. For example, the applications 114 may represent downloaded client-side applications that correspond to server-side services executing in a cloud.

In the example of FIG. 1, the mobile computing device 102 may detect one or more nearby or proximate beacons 116. The beacons 116 represent network elements for connecting the mobile computing device 102 to other computing devices and/or network elements. Exemplary beacons 116 include cellular towers, base stations, base transceiver stations, base station sites, and/or any other network elements supporting any quantity and type of communication modes. Aspects of the disclosure are operable with any beacon 116 supporting any quantity and type of wireless and/or wired communication modes including cellular division multiple access (CDMA), Global System for Mobile Communication (GSM), wireless fidelity (Wi-Fi), 4G/WiMax, and the like.

The mobile computing device 102 stores properties, dimensions, or other beacon observation data for each observed beacon 116. In some embodiments, exemplary properties include an observation time (e.g., timestamp), and a latitude and longitude of the mobile computing device 102 (or other description of the position of the mobile computing device 102) at the observation time. Other exemplary properties are contemplated, however. For example, other exemplary properties include a signal strength, an access point name (APN), and a destination device to which the mobile computing device 102 is connected or attempting to connect.

The cloud service 104 may include a beacon-based positioning service that determines position based on observed beacons 116 or other cell sites. While described in the context of the cloud service 104 receiving and processing the beacon observations, aspects of the disclosure contemplate other entities that receive and/or process the beacon observations. The entities include, for example, a server and/or a peer device. The functionality of the cloud service 104, as described herein, may also be divided among one or more entities. For example, one entity may collect the beacon observations into a storage area for subsequent processing by another entity. The beacon observations may be processed as they are received (e.g., in real time), or may be stored for future processing (e.g., as a batch).

In other embodiments (not shown), portions of the functionality of the cloud service 104 are performed by the mobile computing device 102. For example, the mobile computing device 102 may include a local positioning engine receiving data (e.g., beacon observations, reference content items 304, and/or location information 306) from the cloud service 104. In such embodiments, the mobile computing device 102 performs determines its position refined by the captured images 112 or other captured data.

In general, the mobile computing device 102 captures data (e.g., the images 112) and detects one or more proximate beacons 116. The captured data and the beacon observation data are sent to the cloud service 104. The cloud service 104 performs position determination using the captured data and the beacon observation data and returns an inferred position to the mobile computing device 102. In some embodiments, the inferred position represents the position of the mobile computing device 102 at the time of data capture and beacon 116 detection (e.g., the observation time). The position may be represented by coordinates such as latitude and longitude, by a street address, or other means for representing the position. The cloud service 104 may also return an error radius for the beacon 116 and/or determined position. The error radius may represent a range for each observed beacon 116, and may be dependent upon various factors such as beacon 116 type and/or signal strength. For example, the error radius may correspond to a radius of a circle or other shape (regular or irregular) representing a coverage area for the beacon 104.

Operation of the mobile computing device 102 is further described with reference to FIG. 2 below.

Figure 2:
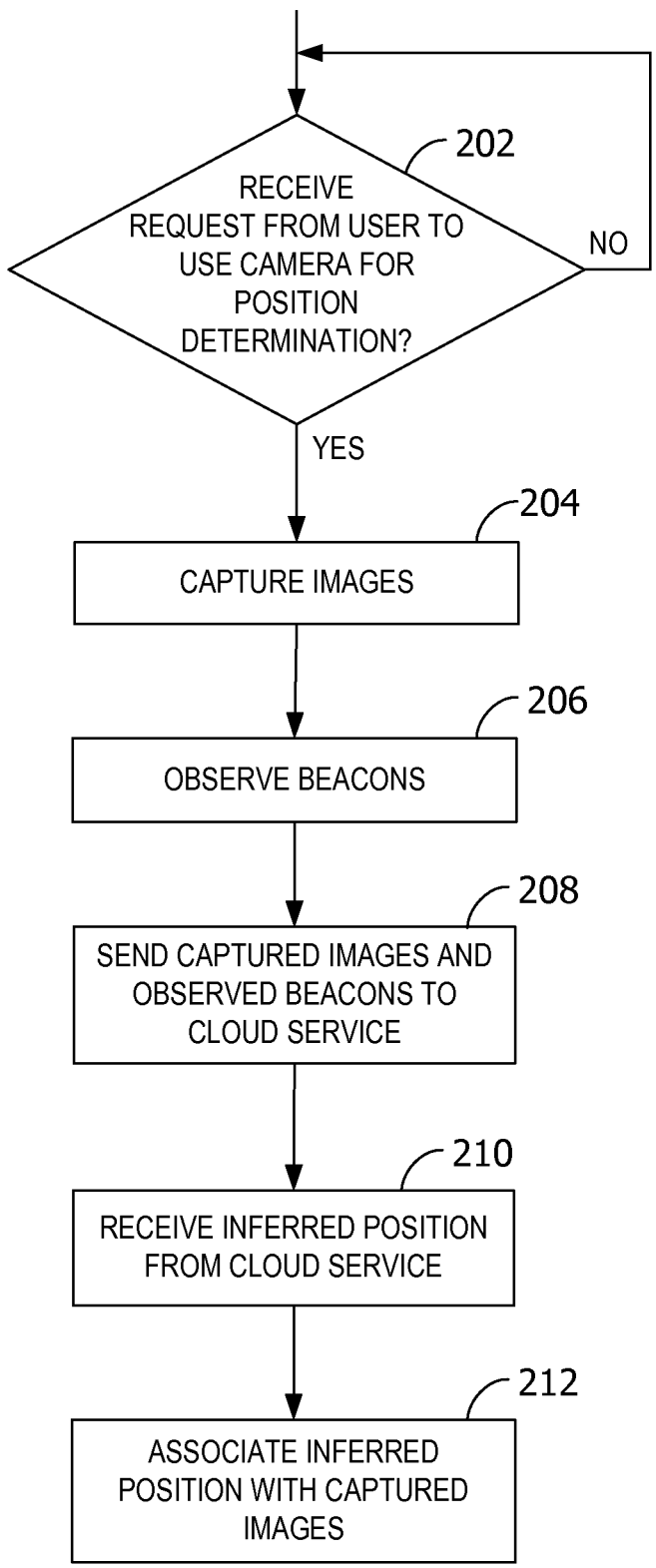
FIG. 2 is an exemplary flow chart illustrating operation of the mobile computing device to capture images and detect beacons to determine a device position.

Referring next to FIG. 2, an exemplary flow chart illustrates operation of the mobile computing device 102 to capture images 112 and detect beacons 116 to determine a device position. While the examples in FIG. 1 and FIG. 2 are described with reference to capturing images 112, the disclosure is not limited to images 112 and instead is operable with capturing any form of content item 502. Further, while the examples in FIG. 1 and FIG. 2 are described with reference to the cloud service 104 determining the device position, aspects of the disclosure are operable with the mobile computing device 102, a peer device, or other entity determining the device position.

The mobile computing device 102 determines whether the user has requested use of the camera to aid in determining the position of the mobile computing device 102. The user may provide the request by, for example, setting a preference or selecting a checkbox (see FIG. 7). If the user requests use of the camera at 202, the mobile computing device 102 captures one or more images 112 at 204. The mobile computing device 102 further detects or observes one or more beacons 116 proximate to the mobile computing device 102 at 206. As described herein, the mobile computing device 102 collects properties or other beacon observation data describing each of the observed beacons 116.

At 208, the mobile computing device 102 sends the captured images 112 and observed beacons 116 to the cloud service 104. The cloud service 104 determines the device position based on the observed beacon 116 and the captured images 112 (e.g., see FIG. 3). If the mobile computing device 102 receives the determined device position from the cloud service 104 at 210, the mobile computing device 102 associates the device position with the captured images 112 at 212. In some embodiments, the mobile computing device 102 presents the determined device position to the user for confirmation before associating the device position with the captured images 112.

In this manner, the mobile computing device 102 is able to obtain the device position without using a satellite-based position determination system such as GPS. For example, the operations illustrated in FIG. 2 may be performed by a mobile computing device 102 that is indoors or otherwise lacks access to GPS satellites.

In some embodiments, the device position is determined in real-time or near real-time and represents a current position of the mobile computing device 102. In other embodiments, the cloud service 104 may determine the device position sometime after the content items 502 are captured. For example, the user may want to create a timeline or history of positions or locations visited during a time period (e.g., while on a vacation, for association with a photo album). In this example, the mobile computing device 102 and/or cloud service 104 creates sets of captured content items 502 and detected beacons 116 for batch processing at a later time.

Figure 3:
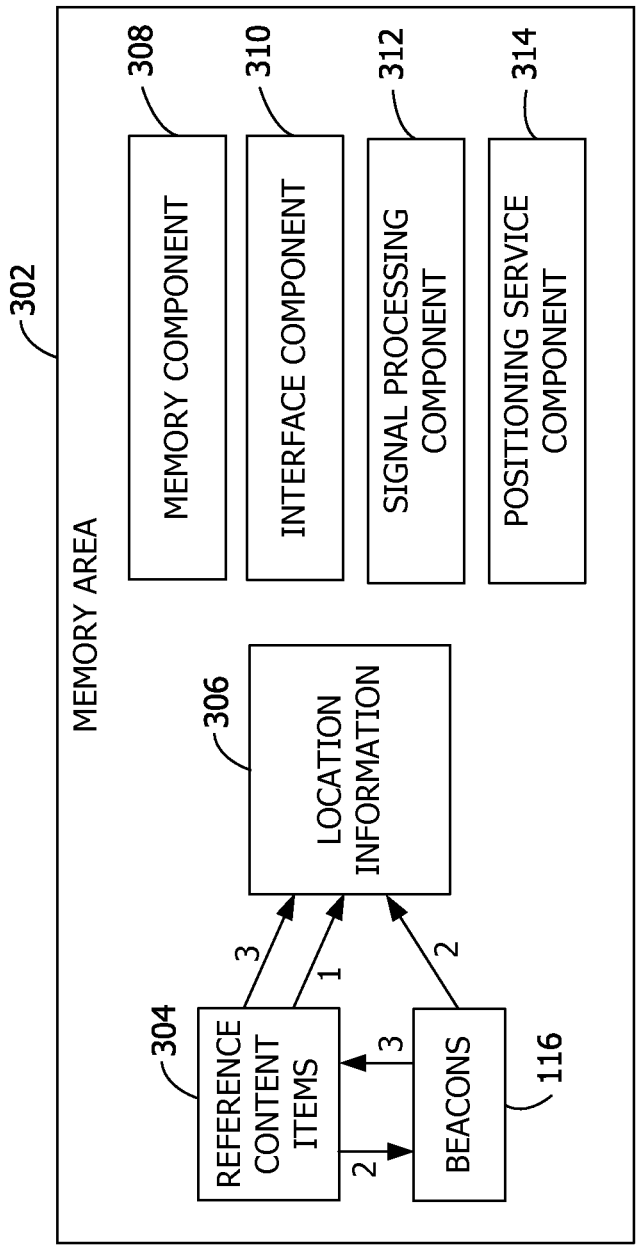
FIG. 3 is an exemplary block diagram illustrating a memory area storing a relationship among reference content items, beacons, and location information.

Referring next to FIG. 3, an exemplary block diagram illustrates a memory area 302 storing a relationship among reference content items 304, beacons 116, and location information 306. The memory area 302 may be associated with the mobile computing device 102, the cloud service 104, or other entity implementing aspects of the disclosure to determine a position of captured content items 502. For example, the memory area 302 may represent the data store 110 of the mobile computing device 102, or storage accessible by the cloud service 104. Further, elements, or portions thereof, stored in the memory area 302 may be stored by both the mobile computing device 102 and the cloud service 104.

In the example of FIG. 3, the memory area 302 stores one or more reference content items 304. The reference content items 304 represent content items 502 collected from, for example, a plurality of computing devices. In some embodiments, the reference content items 304 represent photographs taken by users of the computing devices. Alternatively or in addition, the reference content items 304 include beacons 116 and/or beacon fingerprints. Each of the reference content items 304 has location information 306 associated therewith or corresponding thereto. For each of the reference content items 304, the location information 306 describes the location or position (e.g., observation position) associated with the point of capture of the reference content item 304. Exemplary location information 306 may include an address, GPS coordinates, region, city, state, landmark, business name, or any other metadata that can be used to infer the position.

The entity associated with the memory area 302 (e.g., the mobile computing device 102 and/or the cloud service 104) determines the position of an input content item 502 (e.g., captured by the mobile computing device 102) using the location information 306. The relevant location information 306 for the captured content item 502 may be determined in several ways. In one example, the cloud service 104 uses the captured content item 502 to refine the position determined using position determination services. For example, the cloud service 104 performs beacon-based position determination (e.g., using a beacon fingerprint submitted along with the captured content item 502) to infer the position. The beacon-based position determination produces an inferred position having a particular accuracy or error range. For example, the cloud service 104 may infer that the position is within a 200 meter radius with a 95% confidence rating or level. Given this inferred position and radius, the cloud service 104 compares the captured content item 502 (e.g., a photograph of a coffee shop) to the reference content items 304 to identify a match near the inferred position. The location information 306 for a matching reference content item 304 near the inferred position (e.g., a coffee shop with a known physical address) is then used to refine, replace, or otherwise improve the position determined by the beacon-based positioning service.

In another example (see arrow 1 and FIG. 4), the cloud service 104 may compare the captured content item 502 to the reference content items 304 to identify one or more matching reference content items 304. The cloud service 104 then uses the location information 306 associated with the matched reference content items 304 to determine the position of the captured content item 502. In this example, the cloud service 104 may not have received identification of any beacons 116 detected when the content item 502 was captured by the mobile computing device 102. Alternatively or in addition (see arrow 2), the cloud service 104 may identify one or more beacons 116 previously associated with the matched reference content items 304. The cloud service 104 then uses the location information 306 associated with the identified beacons 116 to determine, or aid in the determination of, the position of the captured content item 502. This scenario may be helpful when the matched reference content items 304 do not have any location information 306 directly associated therewith. This scenario is also helpful when the cloud service 104 wants to combine the location information 306 associated with the matched reference content items 304 with the location information 306 associated with the identified beacons 116 to determine the position.

In an example in which there are no reference content items 304 that match the captured content item 502, the cloud service 104 may try to use the beacons 116 detected by the mobile computing device 102 when the mobile computing device 102 captured the content item 502. For example (see arrow 3), the cloud service 104 compares the detected beacons 116 to beacons 116 previously stored by the cloud service 104 to identify a match. The cloud service 104 identifies the reference content items 304 previously associated with the matching beacons 116. The cloud service 104 then uses the location information 306 associated with the identified reference content items 304 to determine the position of the captured content item 502.

The memory area 302 further stores one or more computer-executable components for implementing embodiments of the disclosure. Exemplary components include a memory component 308, an interface component 310, a signal processing component 312, and a positioning service component 314. Operation of the computer-executable components, when executed, implements the scenario represented by arrow 1 in FIG. 3 and next described with reference to FIG. 4.

Figure 4:
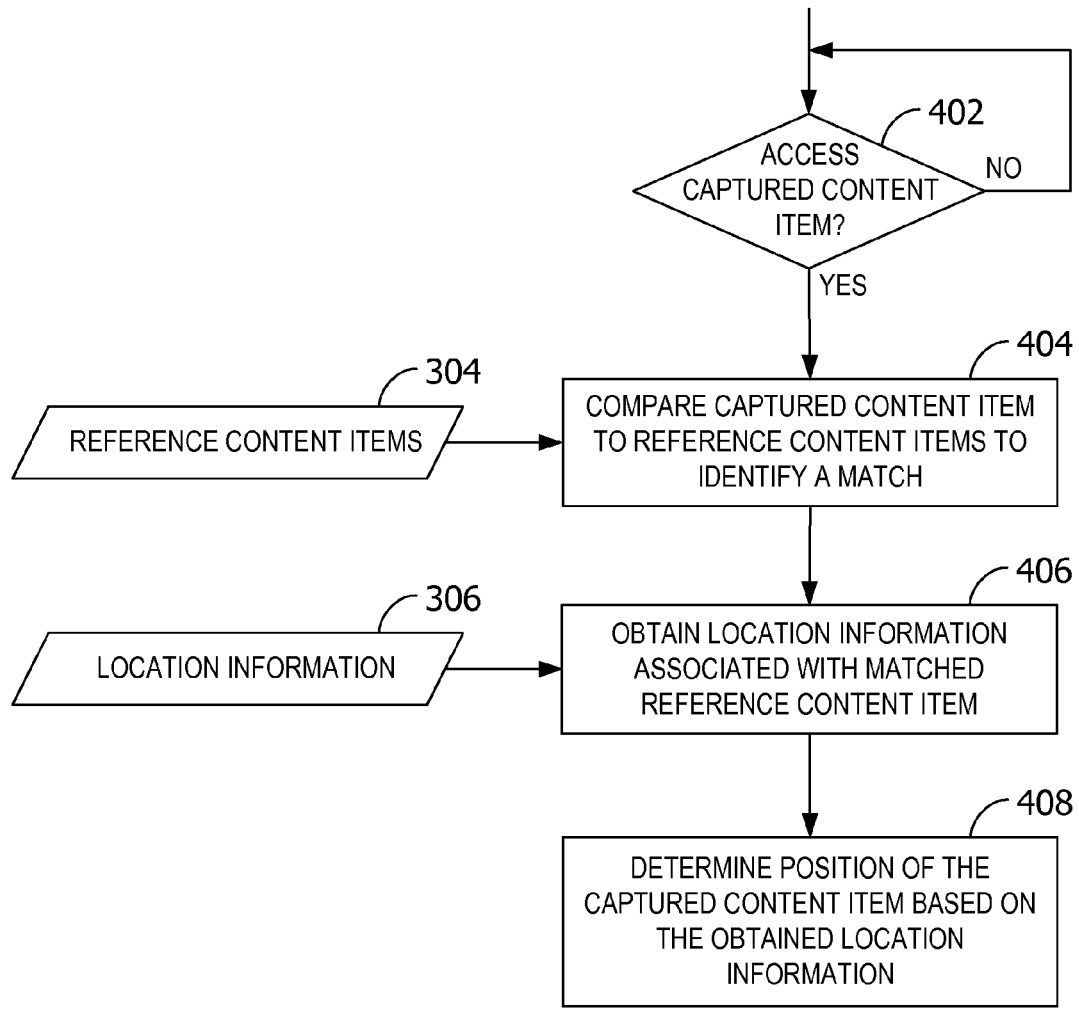
FIG. 4 is an exemplary flow chart illustrating a comparison between captured content items and reference content items having location information associated therewith.

Referring next to FIG. 4, an exemplary flow chart illustrates a comparison between captured content items 502 and reference content items 304 having location information 306 associated therewith. While the operations illustrated in FIG. 4 may be performed by any entity, the operations are next described as being executed by the cloud service 104 using content items 502 captured by a computing device such as the mobile computing device 102.

The memory component 308, when executed by a processor of the cloud service 104, causes the processor to store a plurality of the reference content items 304 and the location information 306 associated therewith. For example, the memory component 308 may store a plurality of the reference content items 304 received from a plurality of computing devices (e.g., mobile computing devices 102).

At 402, the interface component 310, when executed by a processor of the cloud service 104, causes the processor to access at least one of the content items 502 captured by the computing device. For example, the interface component 310 of the cloud service 104 may receive the content item 502 from the computing device. In some embodiments, the interface component 310 includes a network interface card and/or computer-executable instructions (e.g., a driver) for operating the network interface card.

At 404, the signal processing component 312, when executed by a processor of the cloud service 104, causes the processor to compare the content item 502 accessed by the interface component 310 to one or more of the plurality of reference content items 304 stored by the memory component 308. The signal processing component 312 further identifying at least one matching reference content item 304 based on the comparison.

At 406, the cloud service 104 obtains location information 306 associated with the matched reference content item 304. At 408, the positioning service component 314, when executed by a processor of the cloud service 104, causes the processor to determine the position of the accessed content item 502 based on the obtained location information 306. The interface component 310 further sends the position determined by the positioning service component 314 to the computing device for association with the captured content item 502.

In an example, the user takes a photograph of a mountain and submits this photograph as the captured content item 502. The cloud service 104 compares the photograph to reference content items 304 to identify other photographs of the same mountain. After identifying the mountain and obtaining information (e.g., from public data 506) of the actual size of the mountain, the cloud service 104 determines the distance of the mountain from the user when the photograph was taken. The cloud service 104 then estimates the position (e.g., region) based on this distance.

Figure 5:
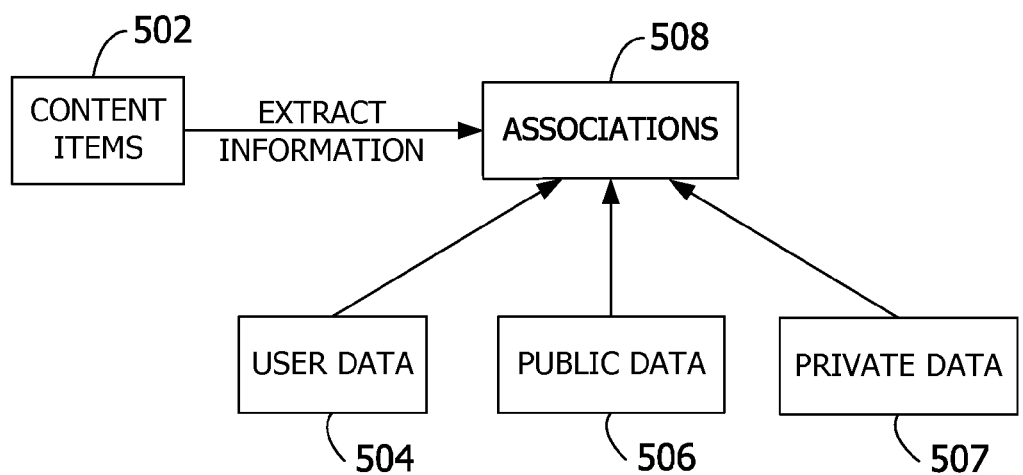
FIG. 5 is an exemplary block diagram illustrating the creation of associations between content items and elements of user data, public data, or both.

Referring next to FIG. 5, an exemplary block diagram illustrates the creation of associations 508 between content items 502 and elements of user data 504, public data 506, private data 507, or any combination thereof. While the associations 508 may be defined by the cloud service 104 and/or the mobile computing device 102 or other entity, the example of FIG. 5 is described with reference to the cloud service 104 defining the associations 508. As described herein, the cloud service 104 compares the captured content items 502 to the reference content items 304 by, for example, performing an image analysis to determine if the captured content items 502 have a similarity to any of the reference content items 304. In the example of FIG. 5, the cloud service 104 extracts information from the content item 502 to use to compare to other information including user data 504, public data 506, and/or private data 507. For example, the cloud service 104 extracts time, people, places, and objects from the captured content items 502. If the content item 502 is a photograph, the time may be found on, for example, a clock included in the photograph, a sunset, a sunrise, or the moon. The time of day may also be received from the computing device that captured the content items 502. People may be identified using facial recognition algorithms, as known in the art, of a person near the user. Places may be identified using image processing techniques, as known in the art, to identify a particular business (e.g., coffee shop), museum, or landmark. Objects may be identified using image processing techniques, as known in the art, to identify text, shapes, monuments, paintings, or artifacts (e.g., in a museum). In examples in which the content items 502 are audio recording, signal analysis can be performed to identify particular sound signatures such as trains, clock towers, and the like from background noise.

Exemplary user data 504 includes user calendars, user preferences, contact information (e.g., user address book), and user check-in information for social networks. Exemplary public data 506 includes public address information, event information, and schedules.

In some embodiments, the cloud service 104 has an agreement with a company to receive private information from the company. For example, the company may provide a photograph of a building owned by the company and/or information describing the building such as an address, notable features, nearby landmarks, etc.

The cloud service 104 compares the extracted information to the user data 504 and/or public data 506 to define the associations 508. The associations 508 may be used to determine the position associated with the captured content item 502. In an example in which the content item 502 is a photograph, the cloud service 104 may identify a store or other business within the photograph. The cloud service 104 searches the public data 506 to produce an address of the identified store. The cloud service 104 may then define the position to be the produced address.

Figure 6:
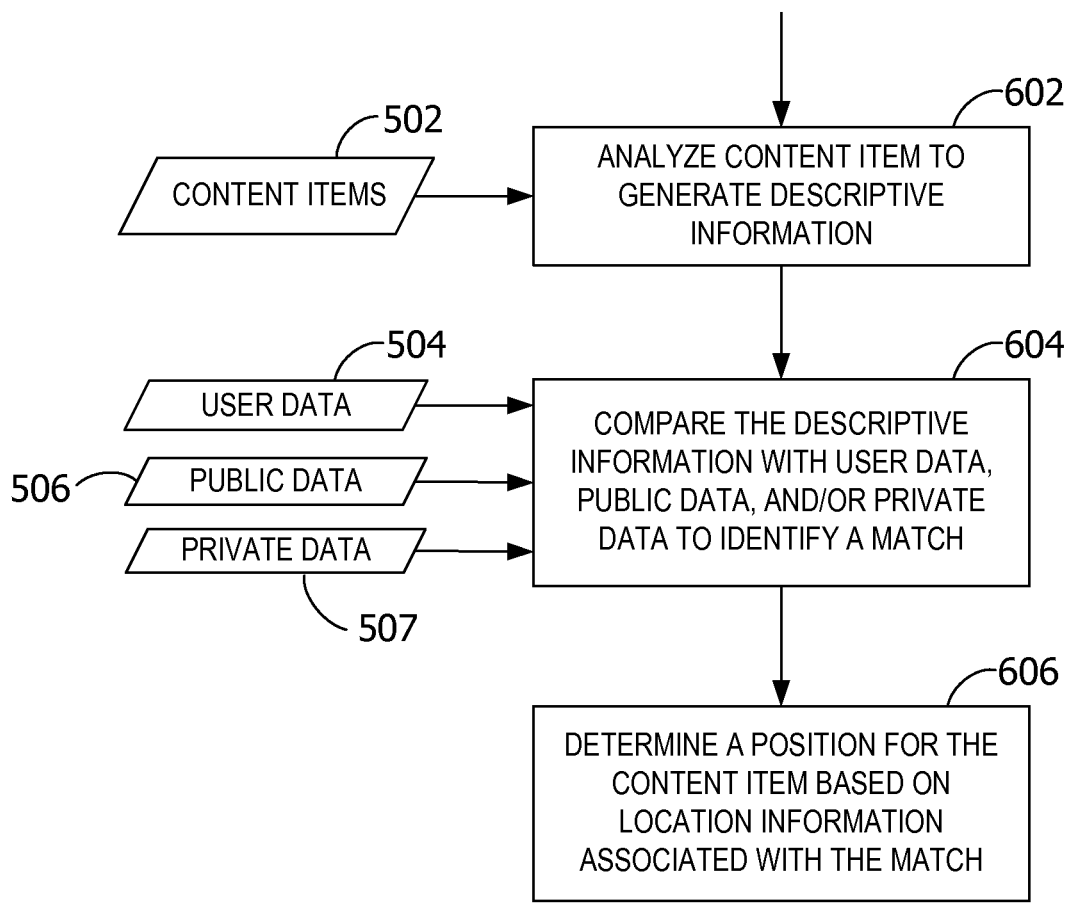
FIG. 6 is an exemplary flow chart illustrating the determination of an inferred position for a content item based on location information associated with matched elements of user data and/or public data.

Referring next to FIG. 6, an exemplary flow chart illustrates the determination of an inferred position for one of the content items 502 based on location information 306 associated with matched elements of user data 504, public data 506, and/or private data 507. While the operations illustrated in FIG. 6 may be performed by any entity, the operations are next described as being executed by the cloud service 104 using content items 502 captured by a computing device such as the mobile computing device 102.

At 602, the cloud service 104 analyzes one or more of the content items 502 to generate information describing the content items 502. At 604, the cloud service 104 compares the generated information to the user data 504, public data 506, and/or the private data 507, or to the location information associated therewith, to identify at least one match. At 606, the cloud service 104 determines or infers the position of the content items 502 based on the location information 306 associated with the matched user data 504 and/or public data 506.

In some embodiments, the cloud service 104 uses the captured content items 502 to refine the position of the mobile computing device 102 determined using position determination services. For example, the cloud service 104 performs beacon-based position determination to infer the position of the mobile computing device 102 (or receives the position from another entity). The cloud service 104 then uses the captured content item 502 from the mobile computing device 102 to refine the inferred position based on the location information 306 associated with the user data 504 and/or public data 506, as described in FIG. 6.

Figure 7:
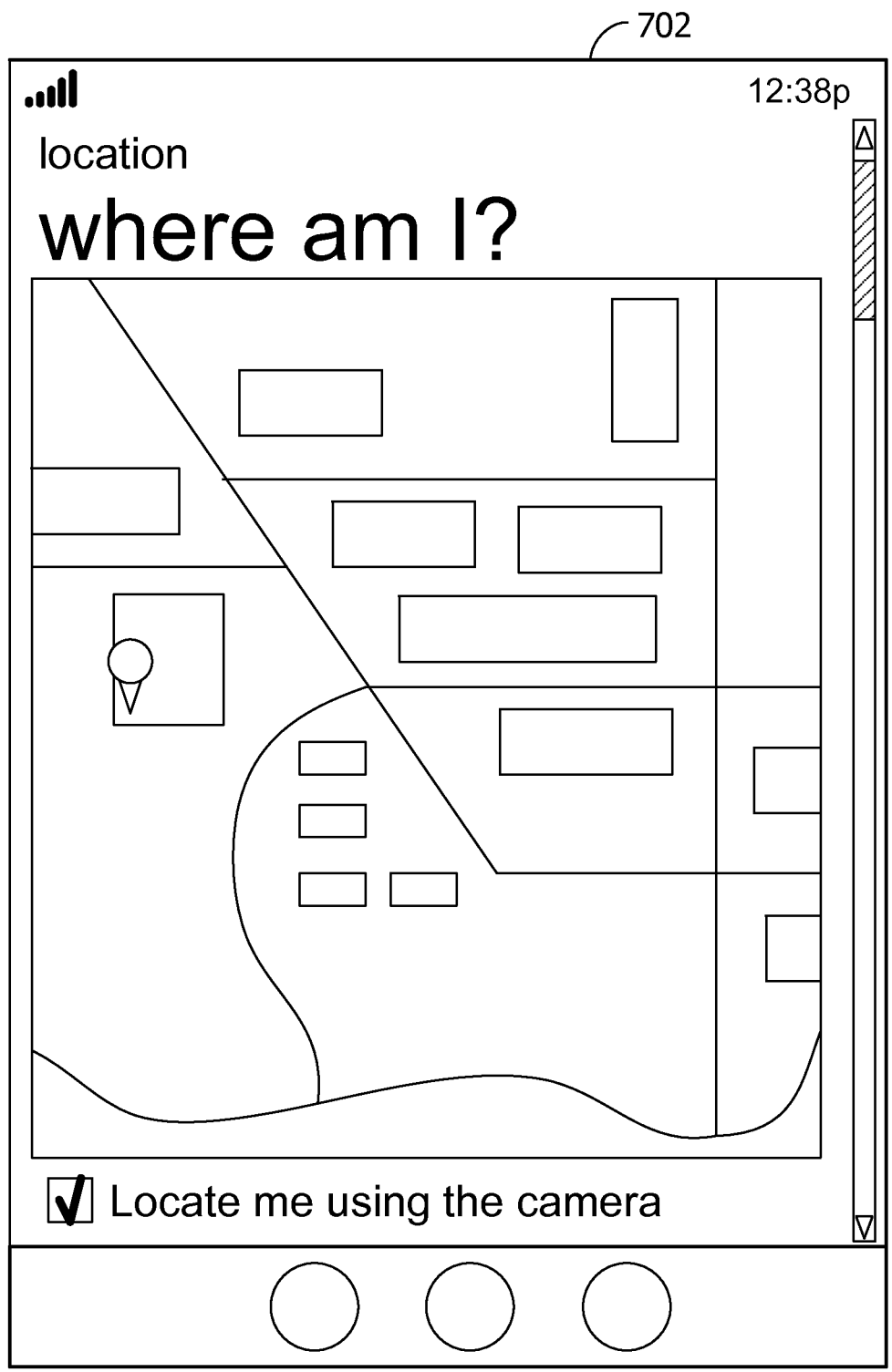
FIG. 7 is an exemplary user interface of a mobile computing device illustrating a mapping application that uses captured images to determine a device position for the mobile computing device.

Referring next to FIG. 7, an exemplary user interface 702 of the mobile computing device 102 illustrates a mapping application that uses captured images 112 to determine a device position for the mobile computing device 102. In the example of FIG. 7, the user has executed a mapping application to determine the device position of the mobile computing device 102. The mapping application includes a checkbox for allowing the user to request use of the camera to aid in determining the current position of the user (e.g., the observation position). After selecting the checkbox, the user takes at least one picture of a nearby landmark, business, geographic terrain, person, or the like. The picture is sent to the cloud service 104, along with any detected beacons 116. The cloud service 104 returns the calculated device position, which is displayed on a map in the user interface 702.

As shown in FIG. 7, the user is located within a building, where GPS is not typically available.

Additional Examples

In some embodiments, a position inferred as described herein is associated with the captured content item 502 as well as any beacons 116 observed at the time of observation. In this manner, the approximate position of "new" beacons 116, or beacons 116 for which no location information 306 is available, may be defined.

In another example, the cloud service 104 receives a plurality of content items 502 captured by the mobile computing device 102 at approximately the same observation time. The cloud service 104 determines positions for each of the plurality of captured content items 502 using any of the embodiments described herein. The cloud service 104 then combines the determined positions to calculate a single position for association with each of the plurality of captured content items 502. For example, triangulation may be performed using the multiple determined positions to calculate the single position. Alternatively or in addition, the error radii of the multiple determined positions may be intersected to identify the single position.

Particular exemplary scenarios describing applications of embodiments of the disclosure are next described. In one scenario, a tourist standing on 5$^{th}$ Avenue in New York City selects a mapping application on the mobile computing device 102 and checks the box "locate me using the camera." The tourist points the mobile computing device 102 to the nearest landmark (e.g., a bookstore) and takes a photograph of the landmark. The photograph, along with any observed beacons 116, is sent to the cloud service 104. The cloud service 104 determines the position using the beacons 116 and/or the photograph, as described herein. Upon receipt of the determined position from the cloud service 104, the mobile computing device 102 displays a map of the tourist standing in front of the bookstore.

In another scenario, a hiker is in the mountains without access to GPS. Using the mapping application on the mobile computing device 102, the hiker stands in one place and rotates to take photographs of nearby mountains (e.g., Mt. Rainer, Mt. St. Helens, and Mt. Curtis Gilbert). The photographs are sent to the cloud service 104 which recognizes the three mountains, determines their positions, and then computes the approximate position of the hiker using the determined positions of the three mountains. The hiker may be presented with a map showing the approximate position of the hiker.

In another scenario, a shopper is in an indoor shopping mall without access to GPS. The shopper executes a mapping application on the mobile computing device 102 and takes a photograph of a nearby storefront. The mobile computing device 102 also observes one or more beacons 116. The cloud service 104 or the mobile computing device 102 compares the photograph to the reference content items 304 to identify a match. The matching reference content items 304 are filtered based on an approximate position determined from the observed beacons 116. Location information 306 associated with the filtered reference content items 304 is then used to refine the determined approximate position. The refined position is then presented to the shopper on a map of the shopping mall on the mobile computing device 102.

In an alternative version of the previous scenario, the mobile computing device 102 is unable to detect any nearby beacons 116 but the shopper identifies the name of the shopping mall. Given the name of the shopping mall, the cloud service 104 or mobile computing device 102 filters the matching reference content items 304 to identify the appropriate reference content item 304. Location information 306 associated with the identified reference content item 304 is then used to calculate the position of the shopper. The shopper may then also request walking directions to nearby stores, a restroom, or the like.

In another scenario, the user takes a photograph of a bar code which is associated with the location information 306. The cloud service 104, or the mobile computing device 102, performs a lookup using the bar code to obtain the location information 306. The location information 306 is then used to determine the position of the user.

At least a portion of the functionality of the various elements in FIG. 1, FIG. 3, and FIG. 5 may be performed by other elements in FIG. 1, FIG. 3, FIG. 5, and/or an entity (e.g., processor, web service, server, application program, computing device, etc.) not shown in FIG. 1, FIG. 3, or FIG. 5.

In some embodiments, the operations illustrated in FIG. 2, FIG. 4, and FIG. 6 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary operating environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices 102, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for inferring the device position based on captured images 112 and observed beacons 116, and exemplary means for determining the device position based on information extracted from the captured images 112.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for supplementing a beacon-based position determination with image matching, said system comprising:
    a memory area associated with a mobile computing device, said memory area configured to store one or more images captured by a user of the mobile computing device; and
    a processor programmed to:
        capture, at a device position, an image using the mobile computing device;
        observe, at the device position, at least one beacon proximate to the mobile computing device;
        compare location information of the captured image with the at least one observed beacon to determine a location of the device position;
        based on the comparing, receive, from a cloud service, a determination of the location of the device position; and
        associate the determined location of the device position with the captured image.

2. The system of claim 1, wherein the processor is programmed to observe the at least one beacon without using a global positioning system.

3. The system of claim 1, wherein the mobile computing device is indoors.

4. The system of claim 1, wherein the processor is further programmed to present the received determination of the location of the device position to the user for confirmation before associating the determined location of the device position with the captured image.

5. The system of claim 1, further comprising means for inferring the device position based on captured images and observed beacons.

6. The system of claim 1, further comprising means for determining the device position based on information extracted from the captured images.

7. A method comprising:
    capturing, at a device, an image using a mobile computing device;
    observing, at the device position, at least one beacon proximate to the mobile computing device;
    compare location information of the captured image with at least one observed beacon to determine a location of the device position;
    based on comparing, receiving, from a cloud service, a determination of the location of the device position; and
    associating the determined location of the device position with the captured image.

8. The method of claim 7, further comprising observing the at least one beacon without using a global positioning system.

9. The method of claim 7, wherein the capturing of the image using a mobile computing device is executed indoors.

10. The method of claim 7, further comprising presenting the received determination of the location of the device position to a user for confirmation before associating the determined location of the device position with the one or more captured images.

11. The method of claim 7, further comprising associating the determined location of the device position with the one or more other images stored in a memory area.

12. The method of claim 7, wherein the determination of the location of the device position is further based on a distance of an identified object in the image from the mobile computing device at a time the image was captured.

13. The method of claim 7, refining the determined location of the device position by:
- associating the captured image with one or more images stored on the mobile computing device;
- accessing location information for the one or more images stored on the mobile computing device; and
- refining the determined location of the device position based on the location information for the one or more images stored on the mobile computing device.

14. The method of claim 13, further comprising displaying the refined device position on a map in a user interface of the mobile computing device.

15. The method of claim 7, further comprising
- capturing, at a second device position, one or more additional images using the mobile computing device;
  - observing, at the second device position, a second beacon proximate to the mobile computing device;
  - providing the one or more additional captured images and identifying the second observed beacon to the cloud service, the cloud service determining the second device position based on the observed second beacon and the one or more additional captured images;
- receiving, from the cloud service, a refined device position based on the device position and the second device position; and
- associating the refined device position with the captured image and the one or more additional captured images.

16. One or more computer storage media embodying computer-executable components, said components comprising:
- a memory component that causes at least one processor to store a plurality of reference content items, the memory component further storing location information associated with the plurality of reference content items;
- an interface component that causes at least one processor to access a content item captured by a computing device;
- a signal processing component that causes at least one processor to compare the content item accessed by the interface component to one or more of the plurality of reference content items stored by the memory component, the signal processing component further identifying at least one of the plurality of reference content items based on the comparison; and
- a positioning service component that causes at least one processor to determine a position for the accessed content item based on the location information associated with the identified content item, and determining a location of the computing device based on the location information for the identified at least one of the plurality of reference content items and from a position of a beacon corresponding to the computing device.

17. The computer storage media of claim 16, wherein the interface component accesses the content item by receiving the content item from the computing device, and wherein the interface component further sends the position determined by the positioning service component to the computing device.

18. The computer storage media of claim 16, wherein the location information for at least one of the reference content items is calculated from a position of a beacon corresponding to the reference content item.

19. The computer storage media of claim 16, wherein the content items comprise one or more of the following: image data, video data, audio data, and accelerometer data.

20. The computer storage media of claim 16, wherein the memory component stores the plurality of reference content items received from a plurality of computing devices.

21. The computer storage media of claim 16, wherein the positioning service component further associates the determined location of the computing device with the accessed content item.

* * * * *